Patented Sept. 7, 1943

2,328,707

UNITED STATES PATENT OFFICE 2,328,707

DECHLORINATION OF HYDROCARBON MIXTURES

Carl Clar and Paul Kühnel, Oberhausen-Holten, and Nikolaus Geiser, Duisburg-Hamborn, Germany; vested in the Alien Property Custodian No Drawing. Application May 27, 1938, Serial No. 210,424. In Germany June 10, 1937

6 Claims. (Cl. 196—44)

Our invention relates to the removal of chlorine from hydrocarbon mixtures and more particularly to the dechlorinating of the mixtures obtained in the polymerization of unsaturated hydrocarbons with the aid of polymerizing agents or condensing catalysts which contain a chlorine compound such as a metal halide.

It is an object of our invention to materially reduce in a simple and efficient manner the proportion of chlorine constituents contained in mixtures which mainly contain hydrocarbons.

It is well known that a considerable amount of chlorine, ranging between about 1000 and 3000 milligrams per litre, in the form of inorganic or organic chlorine compounds is contained in the products of polymerization which are produced, mainly in the manufacture of lubricating oils, by treating olefines or other unsaturated hydrocarbons or hydrocarbon mixtures containing such unsaturated compounds with polymerizing catalysts, such as aluminium chloride. As a rule these polymerization products are separated by distillation into a benzine fraction and a fraction which contains the lubricating oils formed. The benzine fraction separated from the other products of polymerization can be subjected to a cracking treatment for the recovery of a hydrocarbon mixture rich in unsaturated hydrocarbons. In this cracking treatment the chlorine content of the benzine has a vigorous corroding effect on the metal of the cracking apparatus.

It has already been suggested to free such polymerization products from chlorine by heating them in the presence of fuller's earth, but this treatment has been found to be practically inefficient. According to another suggestion the products of polymerization are washed with aqueous alkaline solutions in order to saponify the chlorine constituents, but this treatment is not successful either. Also when replacing the alkaline solutions by solid alkaline oxides no satisfactory removal of chlorine could be effected. Products of polymerization treated with a mixture of zinc oxide and magnesium oxide still contain 500 to 600 mgs. chlorine per litre.

We have now found that hydrocarbon mixtures can be dechlorinated to an extent which suffices for practical purposes by heating such mixtures in the presence of fuller's earth and magnesium oxide. The magnesium oxide may be wholly or partly replaced by zinc oxide.

The new process may be applied with advantage to the products of polymerization mentioned above, the products being subjected to this treatment directly after having been separated from the sludge which contains the main part of the polymerizing catalyst used. However the oily layer formed in the polymerization process may also be first subjected to a distillation and the distillates, or parts thereof, after having thus been freed from the lubricants formed, may then advantageously be treated with a mixture of fuller's earth and magnesium oxide and/or zinc oxide.

An addition of 1.5 per cent fuller's earth and 1.5 per cent magnesium oxide suffices as a rule for a satisfactory removal of the chlorine constituents. Since zinc oxide is more efficient than magnesium oxide, the 1.5 per cent magnesium oxide may be replaced by 0.6–0.8 per cent zinc oxide. If a composition of fuller's earth and magnesium oxide is used, we prefer to heat the mixture with the material to be treated to about 180° C. Lower temperatures, for instance 130–150° C., are sufficient when compositions of fuller's earth and zinc oxide are employed.

If a mixture of magnesium oxide, zinc oxide and fuller's earth is used, the temperature to be maintained during the treatment may range between about 130 and 180° C. The temperature may be the lower, the more zinc oxide is present in the mixture.

As a rule the hydrocarbon mixtures to be purified together with the additions of fuller's earth and magnesium and/or zinc oxide are heated to these temperatures during about 2 to 6 hours, whereupon the fuller's earth and the oxides are separated from the liquid constituents for instance by filtration. The hydrocarbon mixtures thus obtained only contain traces of chlorine, about 30 to 60 mgs. per litre.

If the hydrocarbon mixtures to be dechlorinated contain fractions which boil below the temperature at which the mixture shall be dechlorinated, the treatment is carried out in a closed vessel, such as an autoclave, i. e. under increased pressure.

It is another advantage of our method that the mixtures can easily be filtered in contrast to the case, where only fuller's earth is used.

*Example 1*

A cracking benzine which boils up to 220° C. is polymerized with aluminium chloride in the usual manner, whereupon the highly viscous hydrocarbon mixture is separated from the sludge containing the aluminium chloride contact. This hydrocarbon mixture contains benzines and lubricating oils and in addition thereto chlorinated hydrocarbons and, owing to the solubility of small quantities of the aluminium chloride contact layer in the oily layer formed above it, small quantities of aluminium chloride double compounds. 20 litres of this impure hydrocarbon mixture, separated from the sludge, are stirred two hours together with 400 grams magnesium oxide and 200 grams fuller's earth in a closed stirring vessel at 200° C., the pressure rising to about 7.5 atmospheres above normal. The reaction mixture is then cooled to about 30° C., whereupon the content of the vessel is filtered. Filtration occurs rapidly and results in a clear filtrate, the content of chlorine of which has dropped from 2000 mgs. to 36 mgs. per litre.

*Example 2*

20 litres of same impure hydrocarbon mixture as used in Example 1 and containing 2000 mgs. chlorine per litre are stirred during six hours in an autoclave at 140° C. together with 100 grams zinc oxide and 100 grams fuller's earth. The pressure rises to 4 atmospheres above normal. The mixture is cooled and filtered in the same manner as described with reference to Example 1. The filtrate contains only 47 mgs. per litre.

*Example 3*

A benzine recovered from the raw oil formed in the polymerization of liquid olefines to lubricating oils, by distilling the raw oil in such a manner that the lubricating oils formed in the synthesis remain as distillation residue, contains chlorine merely in form of chlorinated hydrocarbons, since the aluminium chloride double compound contained in the raw oil has a higher boiling point than the benzine distilled from the same. 560 litres of this benzine containing 1700 mgs. chlorine per litre, are heated three hours under stirring with 5.5 kgs. magnesium oxide, 2.5 kgs. zinc oxide and 5 kgs. fuller's earth in an autoclave to 160° C. The pressure rises to 6–7 atmospheres above normal. The benzine recovered from the reaction mixture by cooling and filtering has a boiling end point of 220° C. It contains only 50 mgs. chlorine per litre.

The term "polymerization" as used in this specification and the claims is intended to include also reactions which are sometimes termed condensation reactions.

Various changes may be made in the details disclosed in the foregoing specification without departing from the invention or sacrificing the advantages thereof.

We claim:
1. The method of dechlorinating the polymerization products obtained in the treatment of hydrocarbons with aluminium chloride which comprises heating such polymerization products in the presence of fuller's earth and a member of the group consisting of magnesium oxide and zinc oxide.

2. The method of dechlorinating the polymerization products obtained in the treatment of hydrocarbons with aluminium chloride which comprises the steps of heating such polymerization products in the presence of fuller's earth, magnesium oxide and zinc oxide, and subsequently separating by filtration the solid parts from the liquid constituents thus dechlorinated.

3. The method of dechlorinating the polymerization products obtained in the treatment of hydrocarbons with aluminium chloride which comprises heating such polymerization products under increased pressure in the presence of fuller's earth and a member of the group consisting of magnesium oxide and zinc oxide and subsequently separating by filtration the liquid thus dechlorinated from the solid constituents.

4. The method of dechlorinating the polymerization products obtained in the treatment of hydrocarbons with aluminium chloride which comprises heating such polymerization products in the presence of a small quantity of fuller's earth and a member of the group consisting of magnesium oxide and zinc oxide during about 2 to 6 hours to a temperature ranging between about 130 and 180° C.

5. The method of dechlorinating an impure mixture of hydrocarbons obtained in the polymerization of unsaturated hydrocarbons with the aid of aluminium chloride, which comprises heating such mixture in the presence of fuller's earth and a member of the group consisting of magnesium oxide and zinc oxide.

6. The method of dechlorinating an impure mixture of mainly aliphatic hydrocarbons obtained by distilling the oily layer formed in the polymerization of unsaturated mainly aliphatic hydrocarbons with the aid of aluminium chloride, which comprises heating such mixture in the presence of fuller's earth and a member of the group consisting of magnesium oxide and zinc oxide.

CARL CLAR.
PAUL KÜHNEL.
NIKOLAUS GEISER.